United States Patent [19]

Noggle

[11] Patent Number: 4,979,852
[45] Date of Patent: Dec. 25, 1990

[54] AUTOMATIC PIVOT HEAD

[75] Inventor: Kenneth Noggle, Bloomfield, Mich.

[73] Assignee: GTE Valenite Corporation, Troy, Mich.

[21] Appl. No.: 489,836

[22] Filed: Mar. 2, 1990

Related U.S. Application Data

[63] Continuation of Ser. No. 816,604, Jan. 6, 1986, abandoned.

[51] Int. Cl.$^5$ .............................................. B23B 29/34
[52] U.S. Cl. ..................................... 408/156; 82/1.5; 408/159; 408/714
[58] Field of Search ............... 408/1 R, 147, 150, 151, 408/156, 158, 159, 168, 179, 180, 714; 82/1.4, 1.5

[56] References Cited

U.S. PATENT DOCUMENTS

| | | | |
|---|---|---|---|
| 3,357,080 | 12/1967 | Milewski | 407/113 |
| 3,686,964 | 8/1972 | Thibaut et al. | 408/159 X |
| 3,740,161 | 6/1973 | Milewski | 408/168 X |
| 3,753,624 | 8/1973 | Walker et al. | 408/159 |
| 4,612,831 | 9/1986 | Lehnkuhl | 408/159 X |

FOREIGN PATENT DOCUMENTS

| | | | |
|---|---|---|---|
| 242891 | 6/1946 | Switzerland | 408/158 |
| 310737 | 8/1971 | U.S.S.R. | 408/168 |
| 804220 | 2/1981 | U.S.S.R. | 408/156 |

*Primary Examiner*—Z. R. Bilinsky
*Attorney, Agent, or Firm*—Bill C. Panagos; Robert E. Walter

[57] ABSTRACT

An adjustable tool holder for cutting tools in boring machines having an internal drawbar includes a housing pivotally connected to a rotary spindle and a forwardly disposed cutting tool. A wedged camming surface is positioned forwardly on the drawbar for contact against an internal drive lever axially disposed for pivotal contact against the housing. Upon actuation of the drawbar the housing is stressed to a canted position causing pivotal adjustment of the cutting tool.

1 Claim, 2 Drawing Sheets

AUTOMATIC PIVOT HEAD

This is a continuation of copending application Ser. No. 06/816,604, filed Jan. 6, 1986, now abandoned.

FIELD OF THE INVENTION

The present invention relates to an adjustable tool holder for cutting tools in boring machines and more particularly to a tool holder adjustable by an internal lever member driven by a drawbar.

BACKGROUND OF THE INVENTION

Tool holders used in conjunction with boring tool compensators typically utilize an internal adjustment member for positioning a cutting edge to account for normal wear. These devices employ radially extending internal arms which drive cutting edges in accordance with axial drawbar motion. Devices of this sort, however, result in imbalanced tools and frequently encounter problems such as chattering and poor repeatability.

One type of known tool holder incorporating the beforementioned features is discussed in Walker, U.S. Pat. No. 3,753,624, issued on Aug. 21, 1973 and is commonly assigned to the same assignee as the subject invention GTE Corporation. Walker discloses a tool holder which provides a tool shank supported within a housing by a forward pivotal support and an elastic rearward support. An axially oriented drawbar with a camming surface pivots the shank at the forward most portion of the tool holder by overcoming the resilient force of the rearward support. By moving the drawbar axially, the camming surface stresses the resilient support causing the central shaft member to tilt radially outward. The attached cutting member is thereby radially displaced.

When sufficient force is applied to the cutting edge during normal cutting operation, the resilient force at the rear portion of the shank can be overcome resulting in chattering. Increasing the size of the support, however, limits the application of the tool to larger bore sizes. A tool holder which permits radial adjustment by automated means without chattering and which is adaptable for use in small bore is therefore a desirable advancement in the art of rotational cutting tool holders.

Accordingly, it is a further object of the present invention to provide a highly precise tool holder which allows for automated adjustment for cutting edge wear while at rest or during operation.

Another object of the present invention is to provide a tool holder which allows for radial adjustment to compensate for edge wear by means which are adaptable for use in narrow bores.

Another object is to provide automated adjustment for edge wear by axial drawbar motion where a reduced drive force is employed.

A further object is to provide a method for cutting edge adjustment which is simple to operate and easy to manufacture. Other objects will become apparent to those skilled in the art upon review of the following drawings, description, and claims.

SUMMARY OF THE INVENTION

In accordance with the present invention, there is provided an adjustable tool holder for cutting tools in boring machines comprising a housing rotatable about an axis having a cutting means extending from a forward end wall and rearwardly disposed means for connection with a drive spindle. The cutting means is separated from the connection means by an intermediate section of the housing. The tool holder has an enlarged bore concentric with its rotational axis for receipt of a drawbar and guide means for controlled axial movement. A camming surface is disposed on the forward portion of the drawbar in a direction normal to the rotational axis of the housing for translating longitudinal drawbar movement into radially directed camming force. A lever arm is pivotally mounted within the bore for movement in a first direction normal to the axis. The lever has a first face positioned substantially normal to the axis which faces the forward end wall. The lever also has a second face substantially parallel to the axis which is shaped for camming engagement with the camming surface of the drawbar. The lever is pivotally mounted to permit deflection of the forward end wall and adjustment of the attached cutting means in a direction radially outward from the axis.

The present invention also provides a method for radial adjustment of a cutting tool holder in boring machines comprising initially displacing a drawbar axially in a housing bored for its receipt. A camming surface on the drawbar contacts against a lever member pivotally mounted in the housing and deflects it in a direction normal to the rotational axis. This causes the lever to pivot forwardly against a first contact point on the forward end wall. The lever flexes the end wall portion of the housing displacing the forwardly disposed cutting means in a radial direction.

Several advantages are apparent from the above presented discussion. The use of a drawbar in conjunction with both camming surfaces and an internally pivoting lever reduces the drawbar force required for cutting insert adjustment. One particular advantage of the present invention therefore is the ability to achieve a cost savings through a reduction in power utilization and motor sizing in the drive system for the drawbar.

Another advantage apparent from the discussion above is the high level of precision achievable through internally flexing the forward end wall in relation to the spindle. Extremely slight adjustments can be made to account for cutting wear by the method discussed above without associated problems such as chattering and diminished tool life.

A further advantage of the present invention is the ability to accurately bore small diameters of one inch or less.

BRIEF DESCRIPTION OF THE DRAWINGS

The objects, features and advantages of the present invention will be clearly understood to those skilled in the art by reference to this disclosure and the attached drawings in which.

DETAILED DESCRIPTION OF A PREFERRED EMBODIMENT

Figure 1:
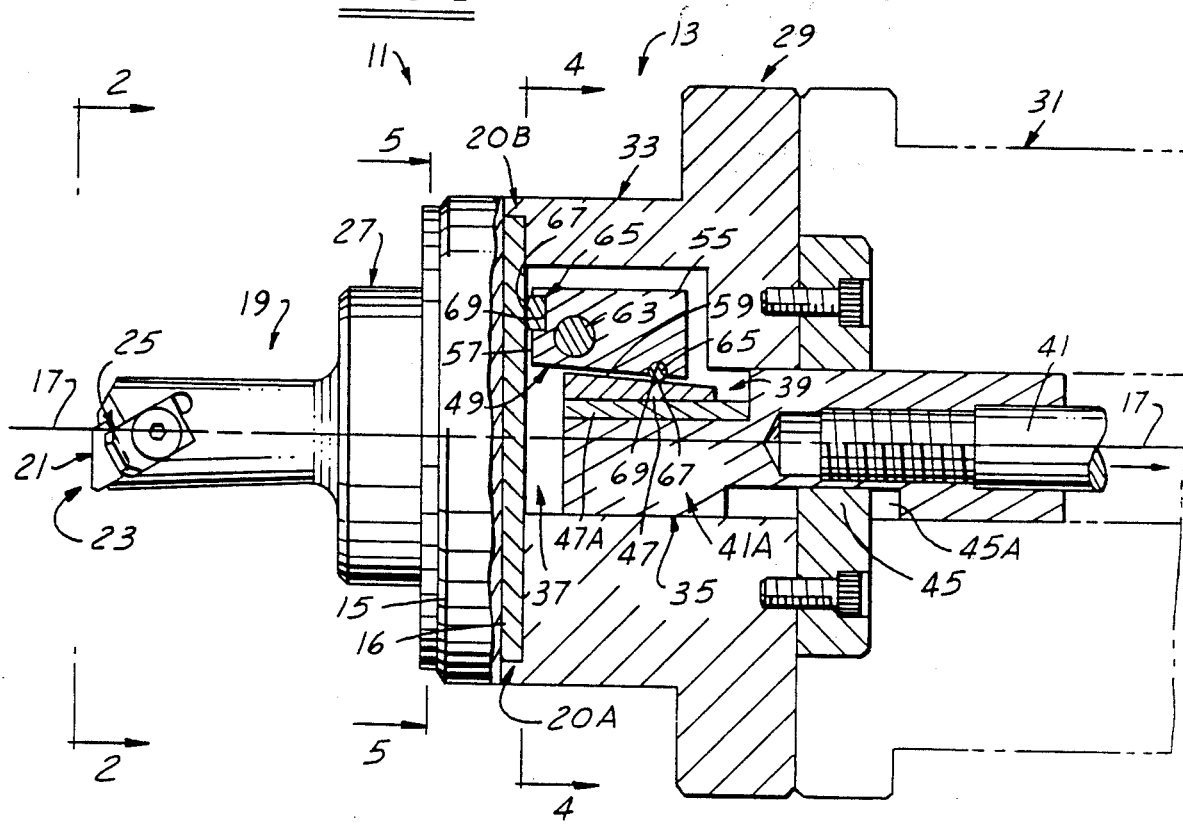
FIG. 1 is an elevated sectional view of a boring tool taken along a plane passing through the rotational axis 17—17.

One embodiment of this invention, illustrated in FIG. 1, is particularly suited for achieving the objects of this invention. FIG. 1 depicts a housing 13 rotatable about an axis 17 and a forwardly extending shank 19 holding a cutting bit 21. Shank 19 is secured to a forward end wall 15 of housing 13 and separated from a rear connecting means 29 by an intermediate section 33.

Forward end wall 15 is attached to intermediate section 33 by bolts and includes contact plate 16. The plate is press fitted between shoulders 20A and 20B of intermediate section 33 to form a flat surface for supporting end wall 15. End wall 15 is preferably a single sheet of material sufficiently resilient to allow for highly precise radial deflection of cutting bit 21 and yet sufficiently rigid to permit the boring of difficult materials without chattering. The end wall may comprise such materials as steel or tungsten carbide.

Figure 2:
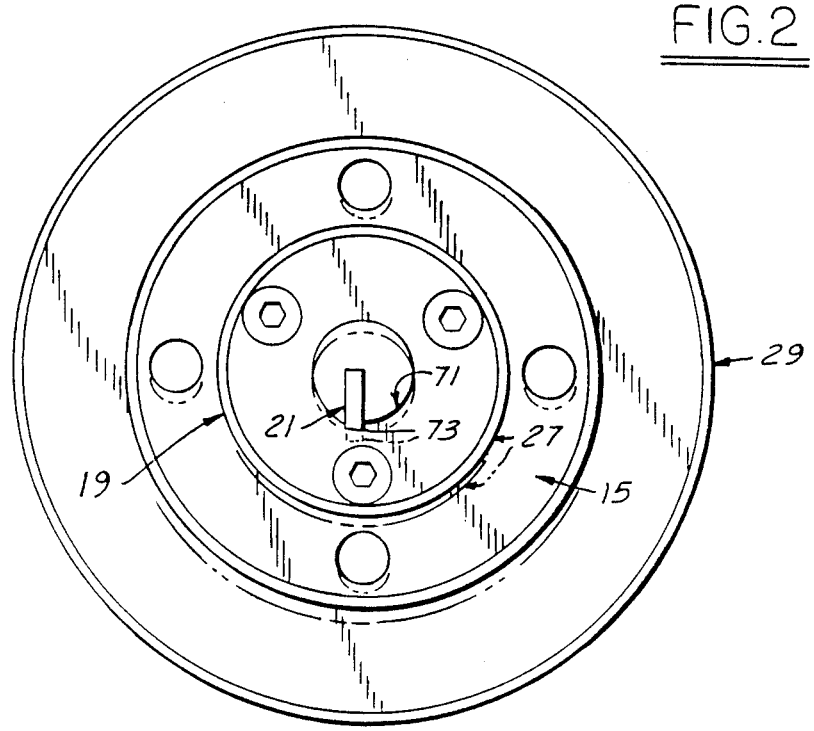
FIG. 2 is an end view of the tool shown in FIG. 1 taken rearward from a plane through line 2—2.
Figure 5:
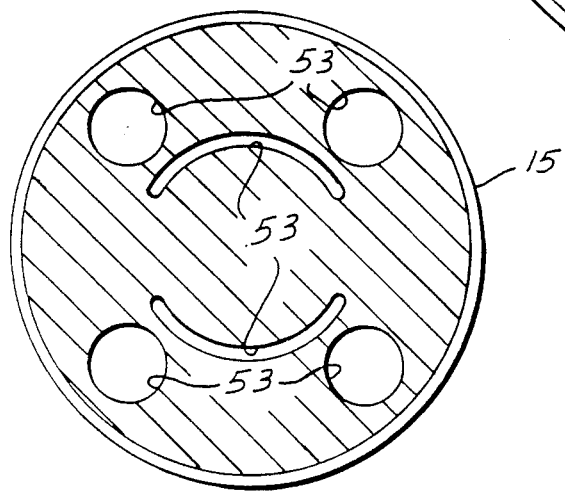
FIG. 5 is a cross-sectional view of an alternate embodiment taken through the plane of Line 5—5 illustrated in FIG. 1.

In an alternate embodiment as seen in FIGS. 2 and 5, forward end wall portion 15 includes dispersed aperature portions 53 which enhance the resilient characteristics of tool holder 11 by reducing the rigidity of end wall 15.

The cutting bit or insert 21 of tool holder 11 is well known in the art and is not limited to any particular embodiment. The type of insert utilized is dependent primarily on the desired function of the tool. In large boring applications, most quick change cutting cartridges may be employed such as described in Milewski, U.S. Pat. No. 3,357,080. In small boring applications of generally one inch or less, the cutting edge 23 fixedly resides in a recessed portion 25 of shank 19 depending forwardly from intermediate section 33. Shank 19 also includes a flange portion 27 rigidly connected to forward end wall 15 as illustrated in FIG. 1.

Connecting means 29 of FIG. 1 is preferably a flange and provides a surface for connecting the tool holder 11 to drive spindle 31. The flange is tightly bolted to spindle 31 to adequately transmit the rotational force of the spindle to the cutting bit 21. The flange has a diameter generally greater than either intermediate section 33 or shank portions 19 of tool 11 and is preferably of steel or tungsten carbide.

Rotary housing 13 has an enlarged recessed bore 35 within intermediate section 33 which is parallel and concentrically oriented with rotary axis 17. The bore has a larger forward section 37 which extends from contact plate 16 of end wall 15 to a rearward section 39 of smaller diameter. The narrow bore of section 39 serves to both support and guide drawbar 41 within bore 35 thereby permitting a controlled axial range of motion.

Figure 4:
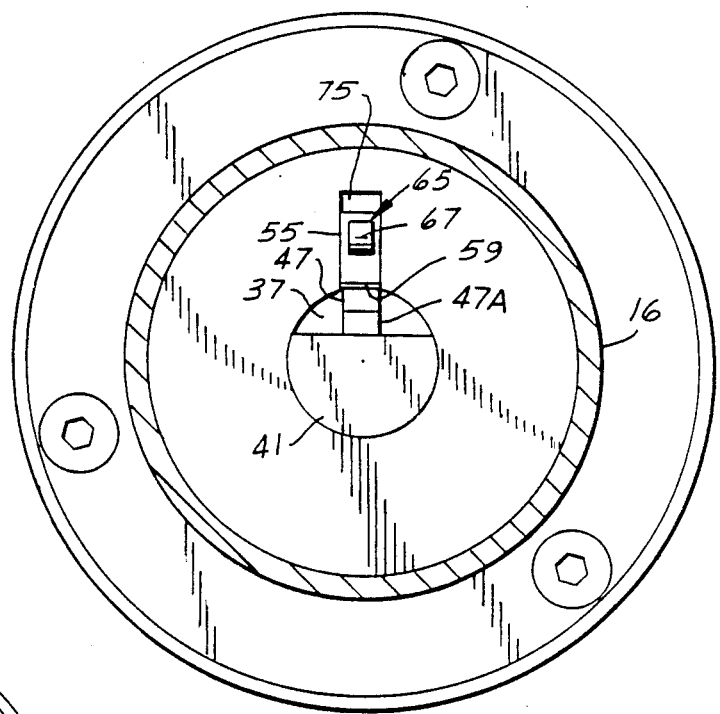
FIG. 4 is a cross-sectional view of an alternate embodiment taken through the plane of Line 4—4 illustrated in FIG. 1.

Alternately bore 35 may have a uniform diameter with a slot 75 milled in forward section 37 for receipt of the lever arm 55 (see FIG. 4).

Figure 3:
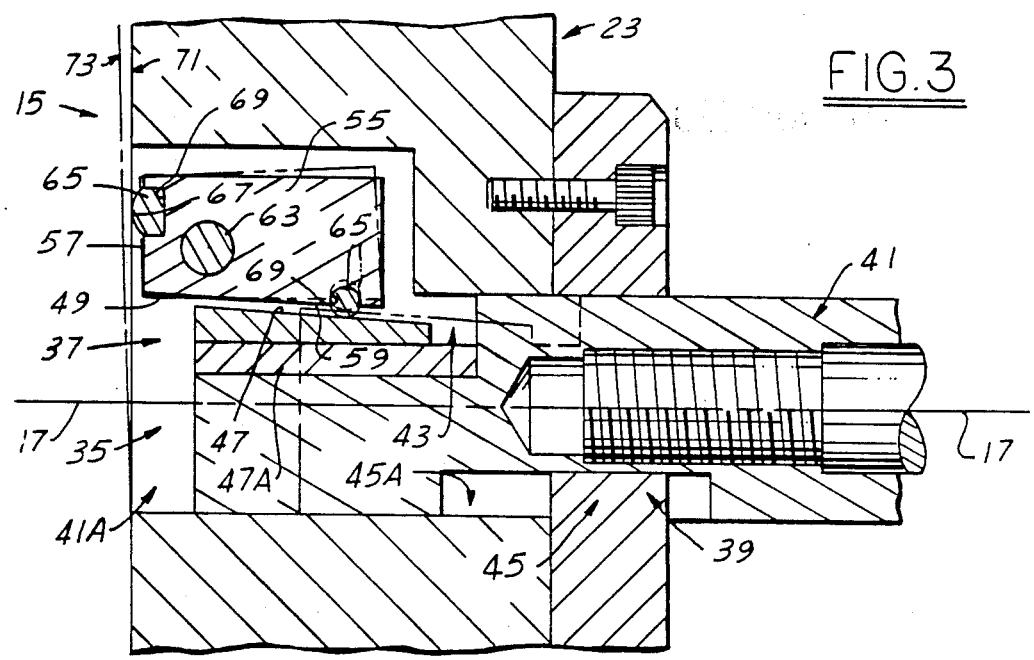
FIG. 3 is an enlargement of the internal cavity of the tool holder illustrated in FIG. 1.

As illustrated in FIGS. 1 and 3, lever arm 55 is polygonal in shape and has a first face 57 directed toward the forward end wall 15 and is substantially normal to rotational axis 17. A second face 59 substantially parallel to axis 17 is shaped for camming engagement with camming surface 47 of drawbar 41.

The lever 55 is mounted to the housing wall within section 37 by a pin 63 forming a pivot point near the intersection of the first and second faces, 57 and 59 respectively. Preferably the lever is rectangular in shape whereby the second face 59 is longer than the first face 57 to enhance the force generating capacity on the end wall 15 when pivoted around pin 63.

Although lever 55 may be positioned anywhere within intermediate section 33, it is preferably positioned radially outward from rotational axis 17 so that when the second face 59 is deflected causing lever 55 to pivot, the radial first face 57 is driven forwardly against contact point 67 with enhanced force. The force generated by the moment arm of the lever on the contact point is sufficient to flex the end wall 15 and thereby radially displace cutting bit 21 from its initial at rest axial orientation 71 to an adjusted position 73 (See FIG. 2).

Regarding FIG. 1, cylindrical drawbar rod 41 is removably mounted within housing 13 and is recessed at 45A for contact with an adjustable rectangular stopping means 45 for axial movement control.

The forward portion 41A of bar 41 is also recessed at 43 for support of a camming surface 47 hereafter referred to as wedged surfaces. The wedge surface may be connected directly to the drawbar or fixed to a support plate 47A. The use of a wedge surface as described herein should not be construed to limit the type of camming surface and is only submitted by way of example.

When fully extended within bore 35, wedge surface 47 abuts contact plate 16 of forward end wall 15 and shares a wedged side with the second face 59 of pivotal lever 55.

The optimum slope of wedge surface 47 and the radial length of first face 57 from axis 17 are known to those skilled in the art and depend in part on the desired geometry and position of pivotal lever 55 and the desired range of adjustment for the tool. As such, no further elaboration will be presented hereafter.

Pivot lever 55 of FIGS. 1 and 3 may also be recessed at 69 for receipt of durable contact tabs 65 composed of material such as tungsten carbide. The tabs are oriented on the first and second axial faces 57, 59 respectively, for contact with the wedge surface 47 of drawbar 41 and the contact plate 16 of forward end wall 15. The tabs function to enhance tool life by reducing wear to wedge and contact point surfaces.

The embodiments which have been described herein are but some of several which utilize this invention and are set forth here by way of illustration but not of limitation. It is apparent that many other embodiments which will be readily apparent to these skilled in the art may be made without departing materially from the spirit and scope of the invention.

What is claimed is:

1. An adjustable tool holder for cutting tools in boring machines comprising:
    a cutting insert,
    a housing rotatable about an axis having a forward end wall, a rearwardly disposed flange for connection with a drive spindle, and an intermediate section connected between said forward end wall and said rearwardly disposed flange,
    said cutting insert separated from said flange by an intermediate section extending forwardly from said forward end wall,
    said housing having an enlarged bore for receipt of a drawbar concentrically oriented with said rotational axis and guide means therein for controlled axial movement, said bore having a forward portion extending rearwardly from said forward end wall and a second rearward portion of smaller diameter, wedge means forwardly disposed on said drawbar,
a level arm pivotally mounted within said forward portion of said bore positioned for deflection by said wedge means in a first direction normal to said axis,
said level arm being substantially rectangular in shape and comprising a first face substantially normal to said axis facing said forward end wall and a second longer face extending rearwardly along said axis, said second face being shaped for camming engagement with said wedge means,
said lever pivotally mounted within said bore to permit deflection of said forward end wall and radial adjustment of said attached cutting insert in response to camming force generated through axial drawbar movement.

* * * * *